Aug. 25, 1931.  W. H. EVERS  1,820,869
FASTENING DEVICE
Filed April 21, 1930  2 Sheets-Sheet 1
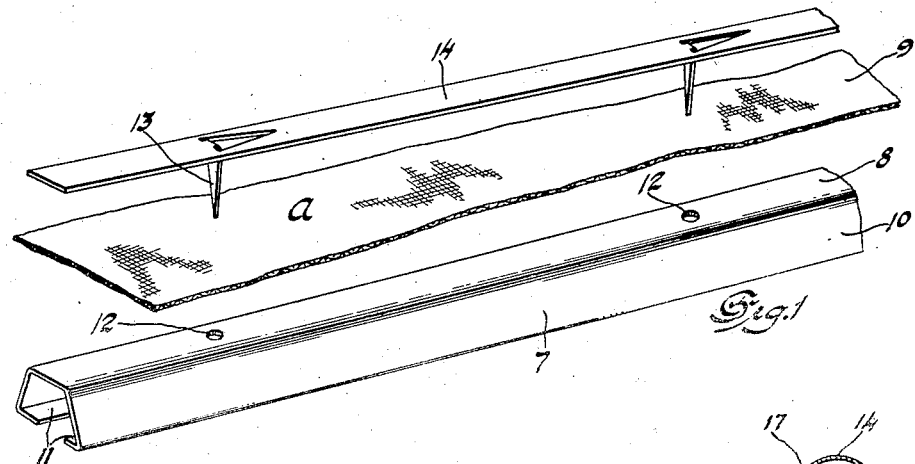
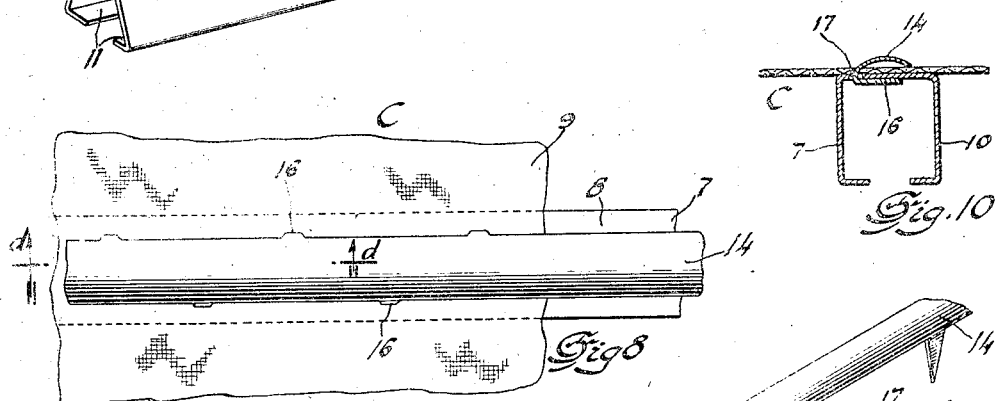
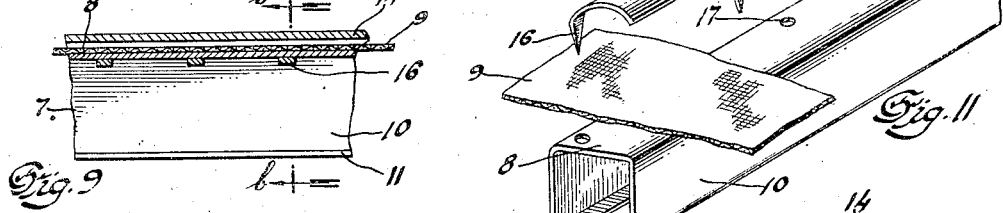
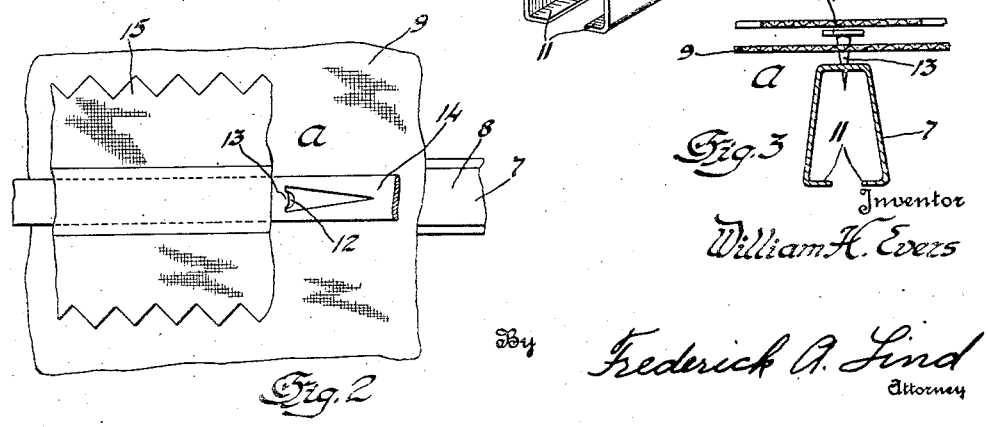
Inventor
William H. Evers
By Frederick A. Lind
Attorney Aug. 25, 1931.  W. H. EVERS  1,820,869
FASTENING DEVICE
Filed April 21, 1930   2 Sheets-Sheet 2
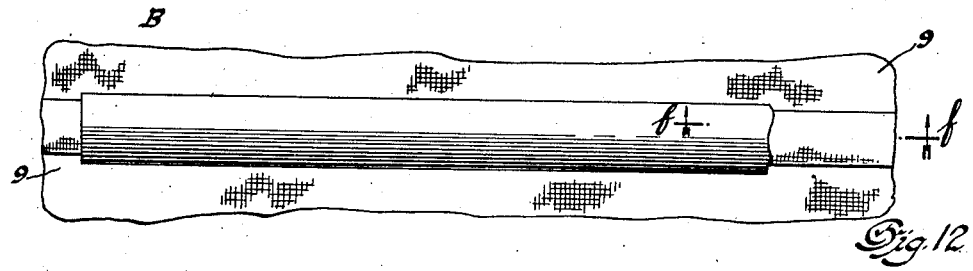
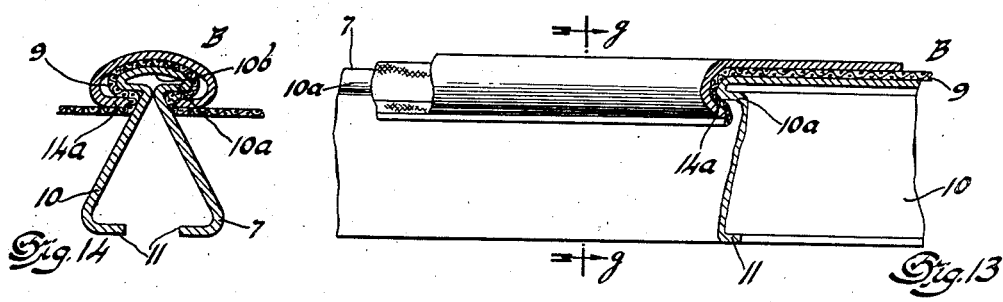
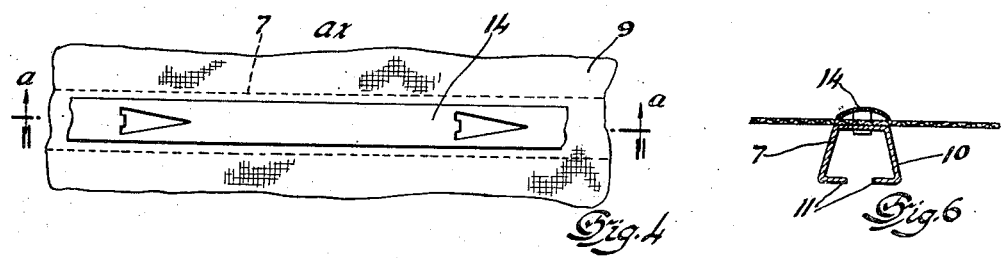
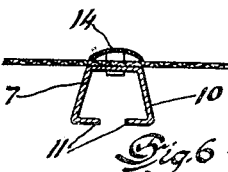
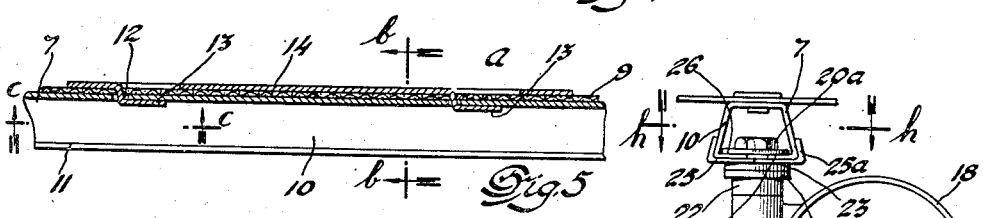
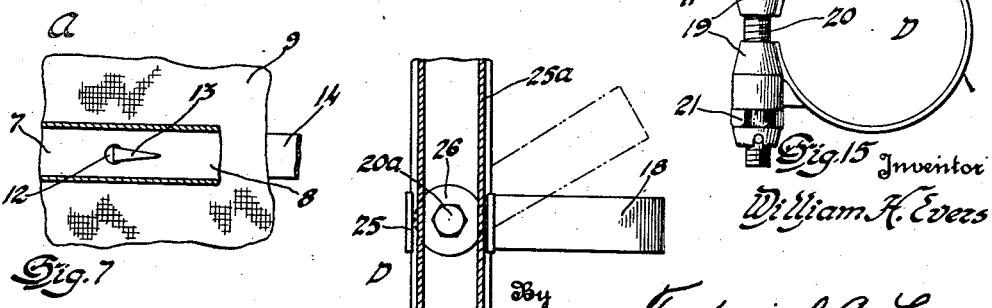
Inventor
William H. Evers
By Frederick A. Lind
Attorney Patented Aug. 25, 1931

1,820,869

UNITED STATES PATENT OFFICE

WILLIAM H. EVERS, OF RUTHERFORD, NEW JERSEY, ASSIGNOR TO GENERAL AVIATION CORPORATION, OF TETERBORO, HASBROUCK HEIGHTS, NEW JERSEY, A CORPORATION OF DELAWARE

FASTENING DEVICE

Application filed April 21, 1930. Serial No. 446,159.

This invention relates generally to fastening devices and is more particularly directed to a method and means of securing fabric or other flexible material to a supporting frame work, as in the fabrication of the fuselage or of the wing of an airplane, or for the production of other structures where fabric or a similar material may be used to enclose a supporting frame.

While my invention, as will be apparent, possesses a wide range of applicability, for the purpose of this disclosure, I will describe it as it may be practiced in the production of a wing or a fuselage of an airplane. However, in electing to confine my description to this specific use, it will be understood that it is not my intention to limit my invention to this particular application, as it will be evident that tents and similar temporary enclosures or housings may be constructed by utilizing the same, as well as boat cabins, vehicle bodies and many other structures wherein a fabric or other flexible material may form the covering for a supporting frame work.

As is well known, in many designs of airplanes, it is now the practice to sew or lace fabric to a rigid frame work in the production of the fuselage or of the wing, or of both of these components of the craft. The methods now followed in lacing or sewing fabric to the frame members of the fuselage or of the wing materially increase the cost of production of the unit and the completed structure does not possess that finished appearance which has become more or less of an essential in aircraft design. Again, by the application of the eyelets for the lacing operation and in the frequent perforation of the covering material in attaching the fabric to the frame members by sewing, the material is weakened. Thus deterioration of the covering material is much more rapid than otherwise would be the case.

Therefore, it is the object of the present invention to provide a method and means of fastening or affixing cloth or other flexible covering material to the frame work of an aircraft fuselage or wing, or to the supporting frame of any structure for any purpose, wherein a flexible covering material, such as cloth or the like may be employed, in which the covering material may be rapidly applied to the frame members in such a way that the disadvantages hereinbefore pointed out as residing in present methods of securing fabric to the frame members of aircraft, for example, are entirely obviated.

It is also an object of this invention to provide a means for attaching fabric or other flexible material to the members of a supporting frame work in such a manner that the fabric will become, in effect, a part of each of those members of the frame to which it is connected, this object being attained by utilizing relatively rigid cooperating elements associated with the frame members and with the fabric itself.

A further object of this invention is to provide securing means which may be expeditiously applied to the supporting frame work to which the covering material is to be attached, the latter material being positively anchored to such means throughout its area of contact therewith. Thus much greater security is afforded than where lacing or sewing is employed for fastening the fabric to the supporting frame work without, in any way, weakening the fabric so that the covering will be more effective in resisting the detrimental effects of drumming than at present.

Other objects and advantages flowing from the practice of my invention will become manifest as the description proceeds and I would have it understood that I reserve unto myself all rights to the full range of equivalents both in structure and in use to which I may be entitled under my invention in its broadest aspect. I shall now describe my invention as it may be practised by means of the several forms of structure illustrated in the accompanying drawings in which:

Fig. 1 is a view in perspective of a preferred form of securing means, illustrating the position which the fabric assumes relative to the cooperating support and fastening means.

Fig. 2 is a top plan view of the structure shown in Fig. 1 with the fastening element in fabric retaining position showing how it may be concealed by an over-lying strip of fabric or the like, cemented or otherwise affixed to the covering on either side of said element.

Fig. 3 is a transverse section of the assembly shown in Fig. 2 with the several components in spaced relationship to disclose their relative positions.

Fig. 4 is a view similar to Fig. 2 in which the securing element is curved in cross section.

Fig. 5 is a longitudinal section on the line a—a of Fig. 4.

Fig. 6 is a cross section on the line b—b of Fig. 5.

Fig. 7 is a plan view taken in the direction of the arrow C of Fig. 5.

Fig. 8 is a plan view of an assembly in which a modified form of fabric securing element is employed.

Fig. 9 is a longitudinal section on the line d—d of Fig. 8.

Fig. 10 is a transverse section on the line b—b of Fig. 9.

Fig. 11 is a view in perspective of the structure shown in Figures 8 to 10 inclusive, with the fabric shown in position on the supporting element and the securing element poised for entrance through the fabric and interlocking with the supporting element.

Fig. 12 is a plan view of a further embodiment of my invention, wherein the fabric perforating prongs of the securing elements shown in the preceding figures are omitted, the fabric being retained in close association with the head of the supporting element to which it is clamped by the complemental securing strip.

Fig. 13 is a sectional view taken on the line f—f of Fig. 12.

Fig. 14 is a cross section on the line g—g of Fig. 13.

Fig. 15 is a view in elevation of a means which may be employed for adjustably connecting the fabric securing device to a member of the supporting frame work, and Fig. 16 is a transverse section taken on the line h—h of Fig. 15.

Referring now to the drawings in detail in which like characters of reference are employed to designate similar parts in the several views, and more especially to the structure shown in Figures 1 to 7 inclusive, the fabric retaining device comprises two elements, one forming a support therefor, while the other serves as a means for securing the fabric on said support. The said supporting element 7 may be formed of metal or other suitable material, and is preferably of a channel cross section, the web 8 providing a flat surface on which the fabric 9 may be superposed while the sides 10 terminate in spaced inturned flanges 11, to provide surfaces adapted to cooperate with attaching means for connecting the support to the members of the frame work to which the covering material 9 is to be applied, as hereinafter explained. While in Figures 1 to 7 inclusive, the sides of the supporting element are outwardly inclined from the web 8 to the base-forming flanges 11 thereof, it is obvious that these sides may be parallel or they may be curved outwardly or inwardly as may be deemed expedient.

As will be observed the web or top surface 8 of the supporting element is perforated as at 12 at intervals to receive the dependent prongs 13 of the securing strip or element 14. These prongs, as shown may be integral with the said strip or element 14 or they may be attached thereto by welding or by any other suitable method. The supporting element 7 and the securing strip or element 14 are cut in suitable lengths and the former permanently or detachably connected to members of the frame work of the fuselage or the like so that the web or top surface 8 is disposed outwardly of the frame members to which it is secured.

In the application of my invention to the construction of a fuselage of an airplane for instance, the supporting elements 7 are connected to the frame work with their web portions or faces 8 exposed and the fabric 9 is then stretched taut thereon and locked thereto by means of the securing strips or elements 14, the prongs 13 of which pass through the fabric and the registering openings 12, the prongs being bent or folded over against the inner face 8 of said supporting member 7 as clearly shown in Figures 5 and 7 to retain the elements 7 and 14 and the fabric 9 in close association. The supporting elements 7 and the cooperating securing elements 14 may be disposed in any position upon the supporting frame work which may be found desirable or necessary in securing the covering material thereto.

When the securing strip or element 14 has been clamped or locked to the supporting element 7 as just described the exposed surface of the securing element may be concealed by cementing thereover a strip of fabric or tape 15 in the same manner that is followed in providing for the protection of the seams where the fabric is sewed or laced to the frame work. (See Figure 2.)

In Figures 8 to 11 inclusive, as will be observed the securing element or strip 14 is curved in cross section, similarly to the securing element shown in Figure 6. In lieu of the centrally disposed prongs of the embodiment shown in Figures 1 to 7 inclusive, a set of prongs 16 is dependent from each of the side edges of the securing strip or element, those along one edge being in staggered relation to the prongs depending from the opposite edge, which are adapted for location within the similarly disposed holes or openings 17 in the supporting member 7, which in this instance, is formed with parallel sides 10 to provide for the disposition of the openings 17 in the supporting surface 8 as shown.

In the modification shown in Figures 12 to 14 inclusive, the supporting element 7, similarly to that illustrated in the preceded figures, is provided with inturned base-forming flanges 11, the sides 10 converging upwardly and merging in the oppositely disposed outwardly directed horizontal portions 10—a connected by a curved surface 10—b forming a bead which constitutes the supporting surface of said element, as is clearly shown in Figure 14. In the application of the fabric 9 to said element, the fabric is placed in position upon the surface 10—b of the bead and a securing strip or element of a cross section complemental to said bead is placed in position thereon, either by springing it over the bead of the supporting element and the fabric associated therewith, or by locating the securing strip in its proper position at the end of the supporting element and sliding it thereupon longitudinally to its proper position. As will be obvious, when the securing element is applied, the fabric is conformed to the shape of the head of the supporting element, the flanges 14—a of the securing strip bearing upon the outer face of the fabric which is firmly clamped between the head of the supporting element and the cooperating complemental securing strip.

As before stated, the supporting element 7 may be attached to the members of the frame work of the structure to which the fabric is to be applied by any suitable means. However, it has been found that assembly may be facilitated and repairs and replacements may be made with greater economy if the supporting element is so connected to the members of the frame work that it may be adjusted relatively thereto. One form of an adjustable connection is shown in Figures 15 to 16 which embodies a clamp comprising a split collar 18 connected to the ears 19 which are bored to receive the shank of a bolt 20, it being obvious that the collar may be contracted or expanded by turning the nut 21 on the protruding end of said bolt to the right or left as the case may be. Mounted on the bolt 20 between the head 20—a and the adjacent ear 19 is a collar 22 on which washers 23 and 24 are superposed to form a support for a seat 25 which is adapted to receive the base of a supporting member 7. This seat, as will be observed, has upstanding side flanges 25—a which are disposed to cooperate or engage with the sides 10 of the supporting element 7 when the latter is positioned upon said seat with its spaced base-forming flanges 11 in engagement therewith. In the application of this attaching means the collar 16 is placed upon the frame member to which a supporting element is to be connected, and the bolt with a collar 22 and the superposed parts placed in position within the ears 19 to receive the securing nut 21 which is tightened sufficiently to hold the collar 18 in position upon the frame work member. One end of the supporting element may now be alined with the seat 25 with its spaced flanges 11 straddling the bolt 20 between the washer 26 and the upper surface of the seat 25. With the supporting element thus alined with the attaching means it may be moved in a longitudinal direction to the desired position whereupon the nut 21 may be turned up upon the shank of the bolt 20 to firmly clamp the flanges 11 of said element between the aforesaid washer 26 and the seat 25. As the seat 25 is rotatable upon the bolt 20 it will be evident that the said seat and the securing element retained therein may be disposed at any angle relative to the frame member which is engaged by the collar 18 which may be required to meet construction demands.

I claim:

1. A means for fastening a flexible covering material to a structural frame work comprising a supporting element for the covering material, of a substantially rigid composition, said supporting element having a surface upon which the covering material is adapted to be disposed and a base in spaced relationship to said surface, said base being slotted longitudinally of said element, a securing element formed for interlocking engagement with said supporting element, the covering material being interposed between said supporting element and said securing element, and a device for attaching said supporting element to a member of said structural frame work, said device embodying a seat for said supporting element formed to support the base thereof and adjustable means for retaining said supporting element within said seat.

2. A means for fastening a flexible covering material to a structural frame work comprising a supporting element for said material, a securing element adapted for interlocking engagement with said supporting element to hold the covering material in position upon said supporting element, and means for attaching said supporting element to a portion of said structural frame work, said means including a clamp formed to frictionally engage the periphery of a frame work member and means cooperatively associated with the clamp actuating medium for connecting said supporting element to said attaching device.

3. A means for fastening a flexible covering material to a structural frame work comprising a supporting element for said material, a securing element adapted for interlocking engagement with said supporting element to hold the covering material in position upon said supporting element, and means for attaching said supporting element to a portion of said structural frame work, said means including a clamp formed to frictionally engage the periphery of a frame-work member and means cooperatively associated with the clamp actuating medium for connecting said supporting element to said attaching device, said supporting element being movable in the direction of its longitudinal axis and about the axis of said clamp actuating medium when connected to said attaching device.

4. A means for fastening a flexible covering material to a structural frame work, comprising a supporting element for the covering material embodying a base portion slotted from end to end, a securing element adapted for interlocking engagement with said supporting element, the covering material being interposed between said supporting element and said securing element, and a device for attaching said supporting element to said frame work, said device comprising means conformed to engage a member of said framework, an element adjustable relatively thereto for locking said latter means in engagement with said frame-work member and means associated with said locking element formed for engagement with said covering supporting element for securing said supporting element to said device, said locking element being disposed within the longitudinal base slot of said supporting element.

In testimony whereof I affix my signature.

WILLIAM H. EVERS.